(12) United States Patent
Reichert

(10) Patent No.: US 10,437,063 B2
(45) Date of Patent: Oct. 8, 2019

(54) WEARABLE OPTICAL SYSTEM

(71) Applicant: Abraham Reichert, Modiin (IL)

(72) Inventor: Abraham Reichert, Modiin (IL)

( * ) Notice: Subject to any disclaimer, the term of this patent is extended or adjusted under 35 U.S.C. 154(b) by 156 days.

(21) Appl. No.: 15/516,412

(22) PCT Filed: Oct. 26, 2015

(86) PCT No.: PCT/IB2015/058247
§ 371 (c)(1),
(2) Date: Apr. 3, 2017

(87) PCT Pub. No.: WO2016/067183
PCT Pub. Date: May 6, 2016

(65) Prior Publication Data
US 2017/0248791 A1 Aug. 31, 2017

Related U.S. Application Data

(60) Provisional application No. 62/068,839, filed on Oct. 27, 2014.

(51) Int. Cl.
*G02B 27/01* (2006.01)
*G02B 7/12* (2006.01)
*G02B 13/00* (2006.01)
(Continued)

(52) U.S. Cl.
CPC ........... *G02B 27/0172* (2013.01); *G02B 7/12* (2013.01); *G02B 13/0065* (2013.01);
(Continued)

(58) Field of Classification Search
CPC .......................... G02B 27/0172; G02B 27/01; G02B 27/0101; G02B 27/0149; G02B 27/017;
(Continued)

(56) References Cited

U.S. PATENT DOCUMENTS 5,034,809 A 7/1991 Katoh
5,151,722 A * 9/1992 Massof ............... G02B 27/017
351/158

(Continued)

FOREIGN PATENT DOCUMENTS

CN 203278946 11/2013
CN 203786407 8/2014
(Continued)

OTHER PUBLICATIONS

PCT Search Report and Written Opinion PCT/IB2015/058247, received Mar. 1, 2016.

*Primary Examiner* — Kristina M Deherrera
(74) *Attorney, Agent, or Firm* — Dekel Patent Ltd.; David Klein

(57) ABSTRACT

A wearable optical system allows a user to watch a large screen, such as a smartphone screen, in a wide field of view (FOV) with both eyes, the field superimposed on the real world. The screen displays two separate zones to be the data source for each eye. The system includes two projection optical subassemblies based on a pupil forming eye piece. The interpupilarity distance (IPD) is adjusted by rotating each optical subassembly about a pivot, which is perpendicular to its specific display zone.

10 Claims, 13 Drawing Sheets

(51) Int. Cl.
*G02B 25/00* (2006.01)
(52) U.S. Cl.
CPC ....... *G02B 13/0095* (2013.01); *G02B 25/001* (2013.01); *G02B 27/0176* (2013.01); *G02B 2027/013* (2013.01); *G02B 2027/0123* (2013.01); *G02B 2027/0132* (2013.01); *G02B 2027/0134* (2013.01); *G02B 2027/0152* (2013.01); *G02B 2027/0154* (2013.01)
(58) Field of Classification Search
CPC ............ G02B 27/0176; G02B 27/0179; G06T 19/006; H04N 13/044; H04N 5/7491
USPC ................. 359/630–633; 345/7–9, 632–633; 348/113–120; 349/11
See application file for complete search history.

(56) References Cited

U.S. PATENT DOCUMENTS

| | | | |
|---|---|---|---|
| 2001/0013972 A1* | 8/2001 | Doany | G02B 27/0172 359/489.11 |
| 2004/0004584 A1 | 1/2004 | Hebert | |
| 2009/0303315 A1 | 12/2009 | Charlesworth | |
| 2014/0130148 A1 | 5/2014 | Sako | |
| 2014/0152531 A1 | 6/2014 | Murray | |

FOREIGN PATENT DOCUMENTS

| | | |
|---|---|---|
| EP | 0636916 | 2/1995 |
| JP | 2010/145690 | 7/2010 |

* cited by examiner

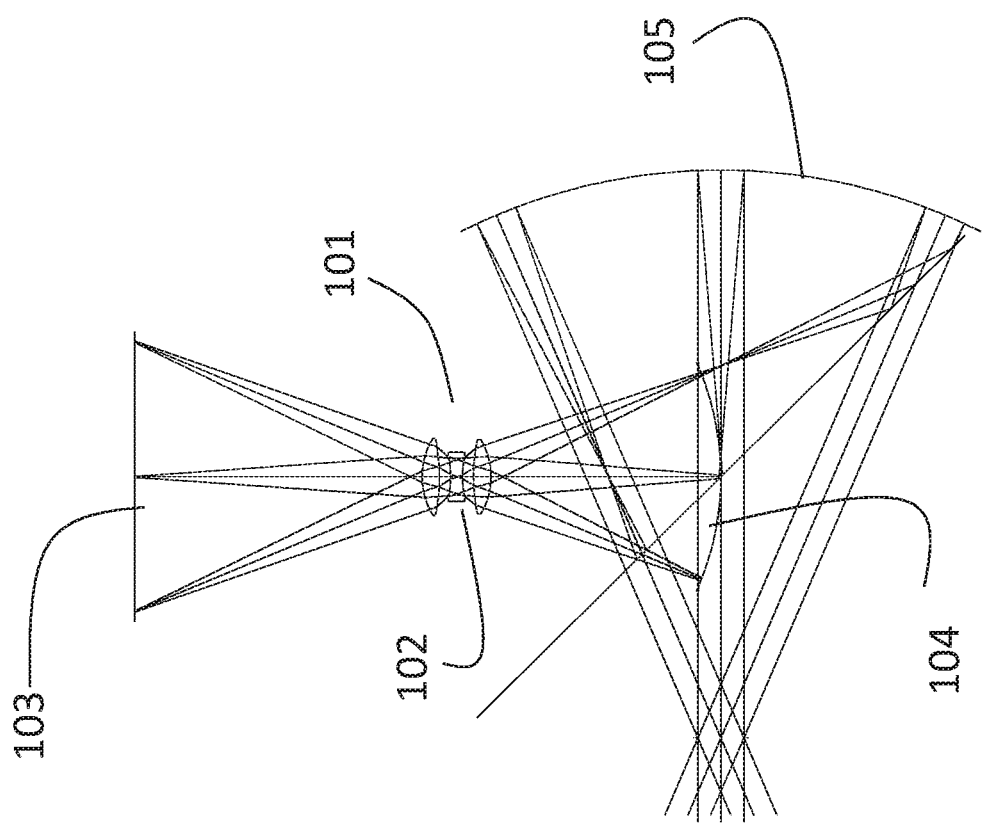

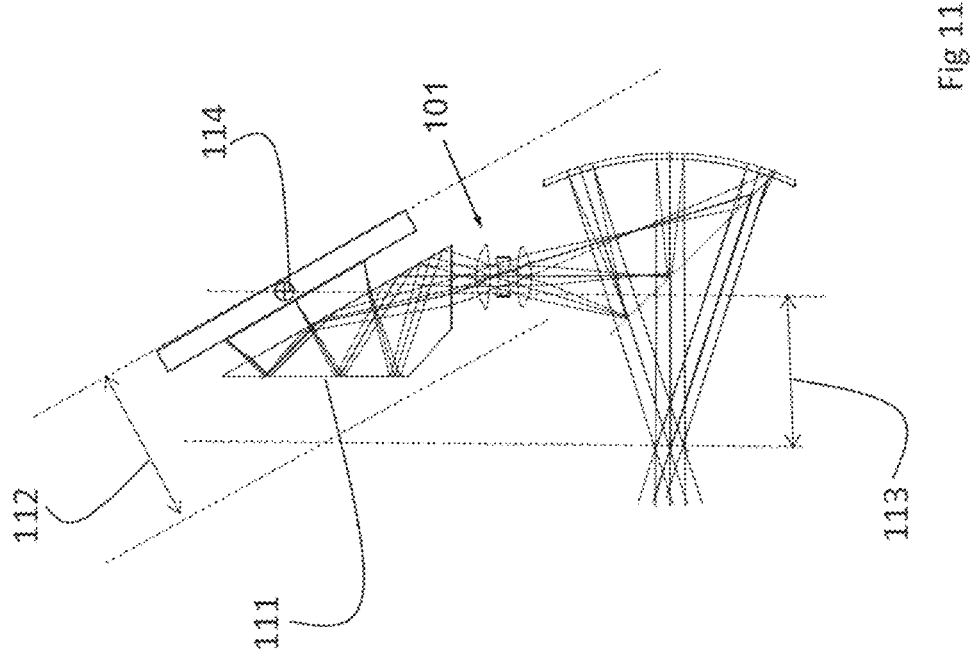

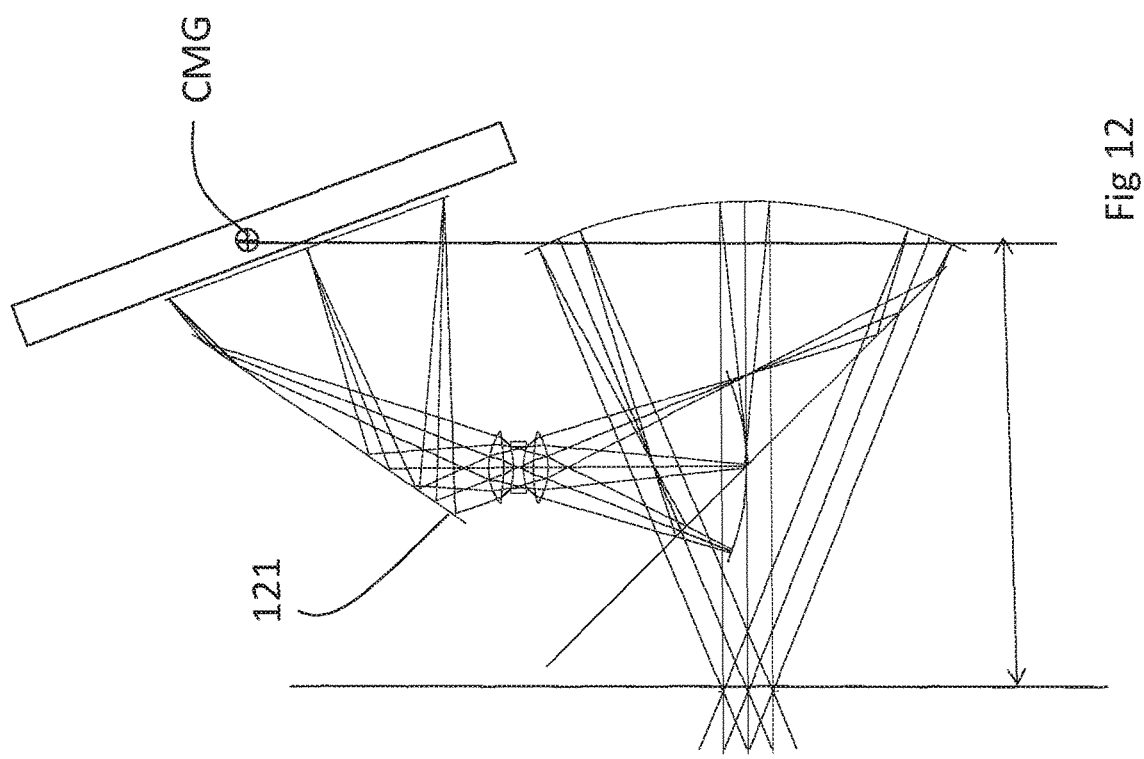

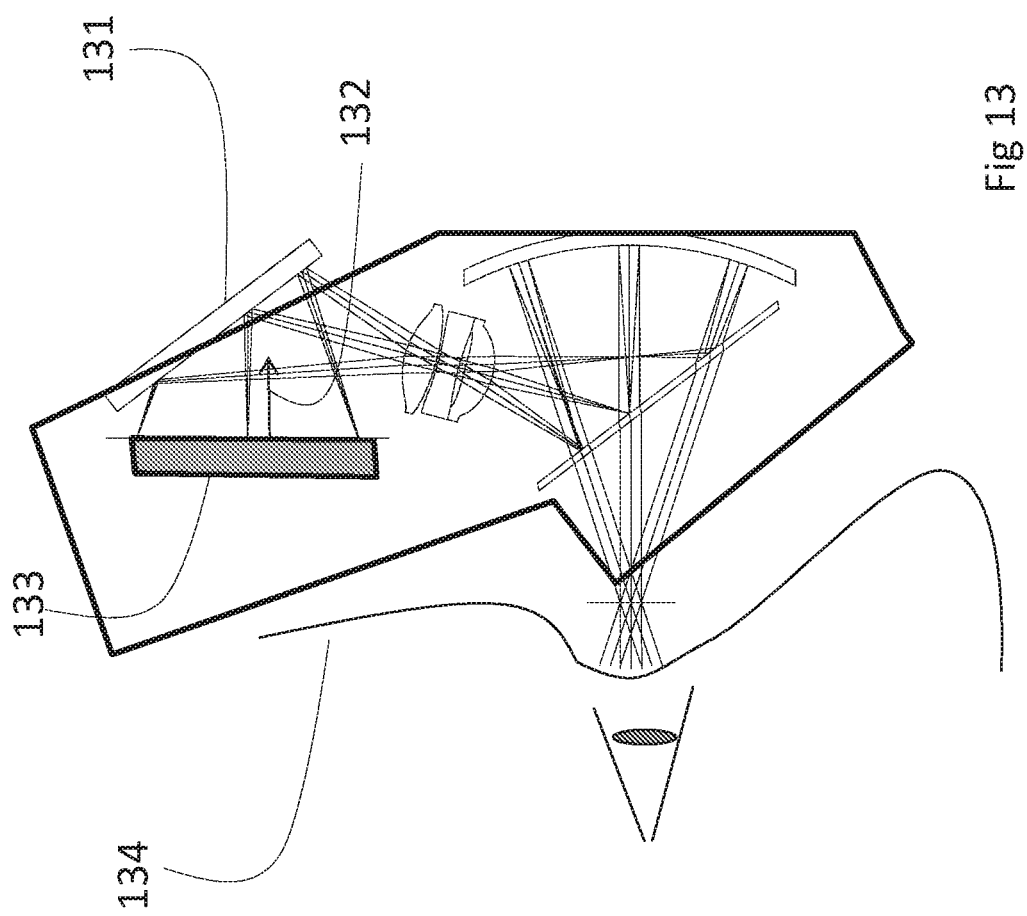

WEARABLE OPTICAL SYSTEM

FIELD OF THE INVENTION

The present invention relates generally to wearable optical systems, and particularly to such a system with a head-mounted display for a device screen, such as a smartphone.

BACKGROUND OF THE INVENTION

Many users of smartphones view the display of the smartphone while walking. This can lead to accidents and embarrassing situations, in which the user is not cognizant of his/her surroundings while viewing the smartphone display. The same holds true for virtual reality systems, such as OCULUS, which do not allow the user to see simultaneously the real world while watching data displayed on a smartphone.

SUMMARY OF THE INVENTION

The present invention seeks to provide a head-mounted display for a device screen, such as a smartphone, as is described more in detail herein below.

Without limitation, some embodiments of the head-mounted display (HMD) allow the user to see the real world while watching data displayed on a screen; have low weight; keep the center mass of gravity as close to the human head as possible, and provide a large field of view (FOV). In addition, the invention is economically attractive with a lower price.

BRIEF DESCRIPTION OF THE DRAWINGS

The present invention will be understood and appreciated more fully from the following detailed description taken in conjunction with the appended drawings in which:

FIG. 10 is a simplified schematic illustration of a relay lens located at a stop of the eyepiece, in accordance with an embodiment of the present invention.

FIG. 11 is a simplified schematic illustration of adding a 90-60-30 prism above the relay lens, in accordance with an embodiment of the present invention.

FIG. 12 is a simplified schematic illustration of using a simple mirror in the system.

FIG. 13 is a simplified illustration of another embodiment showing a display screen facing the opposite of the user.

DETAILED DESCRIPTION OF THE PRESENT INVENTION

Figure 1:
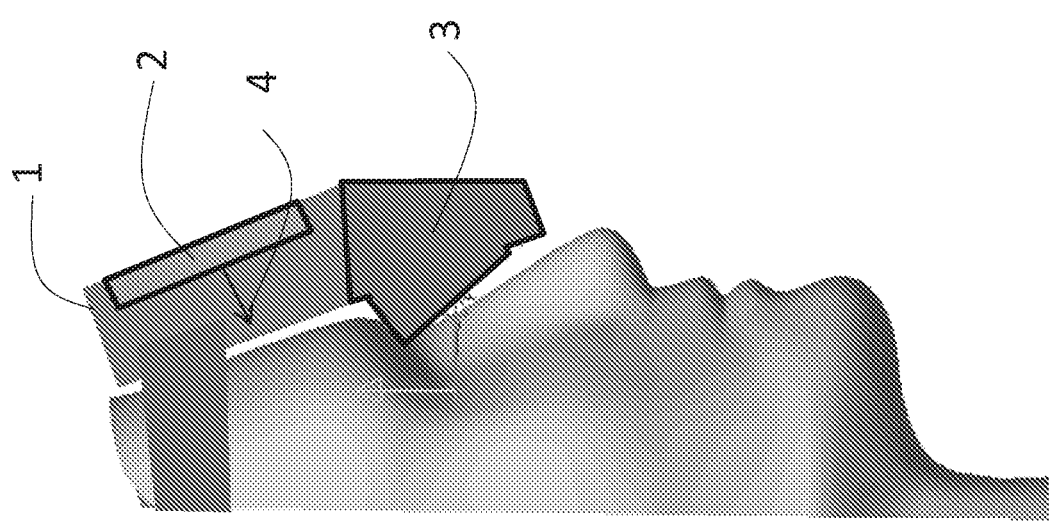
FIGS. 1 and 2 are simplified illustrations of a wearable optical system, constructed and operative in accordance with an embodiment of the present invention.
Figure 2:
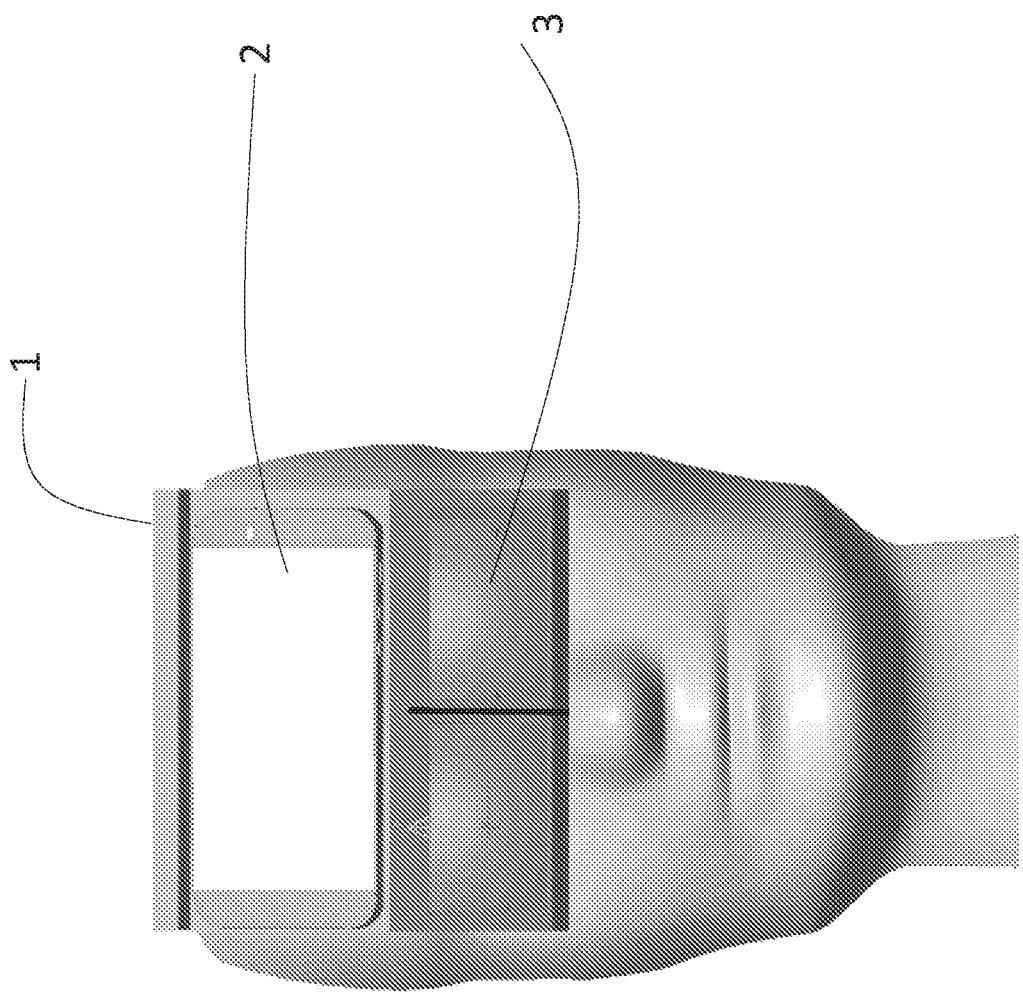
Figure 6:
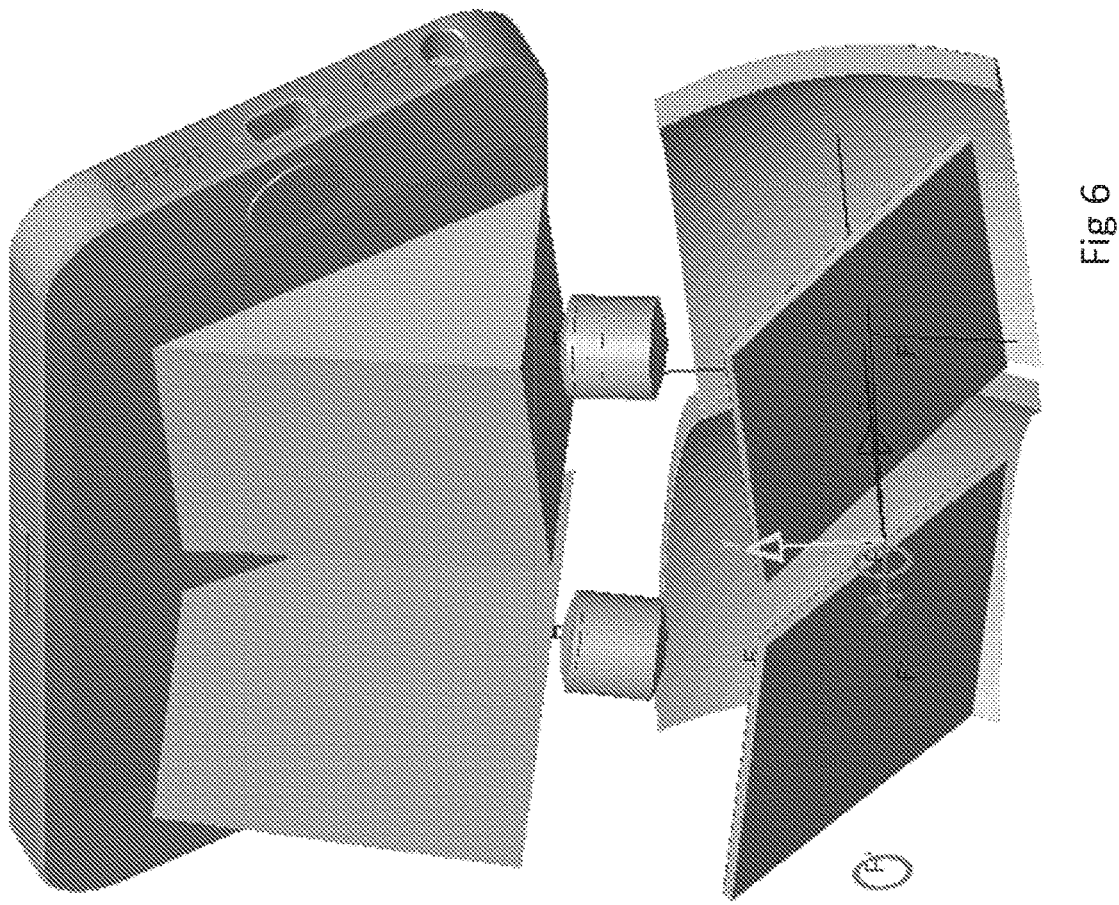
FIG. 6 is a simplified perspective illustration of the embodiment of FIGS. 1 and 2.

Reference is now made to FIGS. 1 and 2, which illustrate a wearable optical system, constructed and operative in accordance with an embodiment of the present invention. FIG. 6 shows a perspective view of this first embodiment.

The wearable optical system includes three subassemblies
1. A main body 1 attached to the user's head
2. A display 2
3. Projection optics 3 one for each eye The main body 1 includes a rigid and convenient attachment to the user head, a fixture to hold display 2 (also called screen 2), and a mechanical fixture to allow each projection optics 3 to rotate around a pivot P perpendicular to the screen and located at the center of the FOV.

The display 2, which faces towards the user face (as indicated by arrow 4), can be any electronic display large enough to display two images for each eye, such as but not limited to, a cell phone screen, etc. The displayed zone for each eye can be a smaller part of a large screen like a smartphone's screen, or can be separate small display for each eye.

Figure 3:
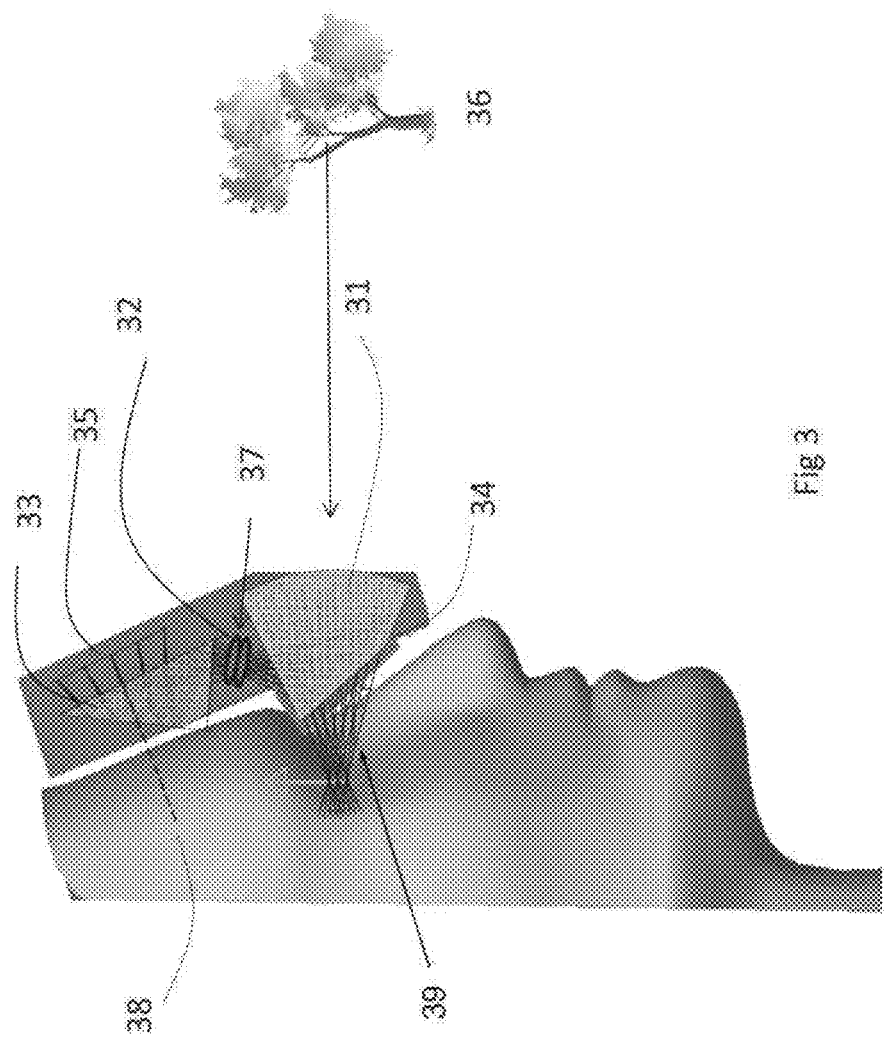
FIG. 3 is a simplified illustration of projection optics, including an eye-piece, a relay lens and a folding prism, in accordance with an embodiment of the present invention.

Each projection optics 3 is based on three subassemblies as can be seen in FIG. 3, including an eye-piece 31, a relay lens 32 and a folding prism 33.

The eye-piece 31 contains a semi-reflected mirror with optical power 39 and at least one semi-reflected surface 34 that enables superimposing the display image (screen) 35 onto the real-world 36. The relay lens 32 is located near the stop 37 of the projection optics and relays the image 35 towards the eye-piece image plane.

The folding prism 33 is located between the relay lens 32 and the screen 35. This decreases the volume of the system and defines the proper orientation of the display with respect to the center line of sight (LOS).

Interpupilarity Distance (IPD) Adjustment

It is well known that every person has a different IPD. The IPD range is between 52 to 78 mm. Since this optical arrangement is based on pupil forming optics, it is important to adjust each of the projection optics exit pupil to be coincident with the user eye's pupil to reduce optical aberrations.

This can be achieved by lateral adjustment but in such a case one has to move the display zone respectively. Since the movement is about ±7 mm, for each eye this would reduce the size of the display zone and thus reduce the total resolution for each eye.

In accordance with an embodiment of the invention, an easier solution is provided, namely, rotating each of the projection optics around a pivot P which is located in the middle of the FOV and perpendicular to the screen.

Figure 4:
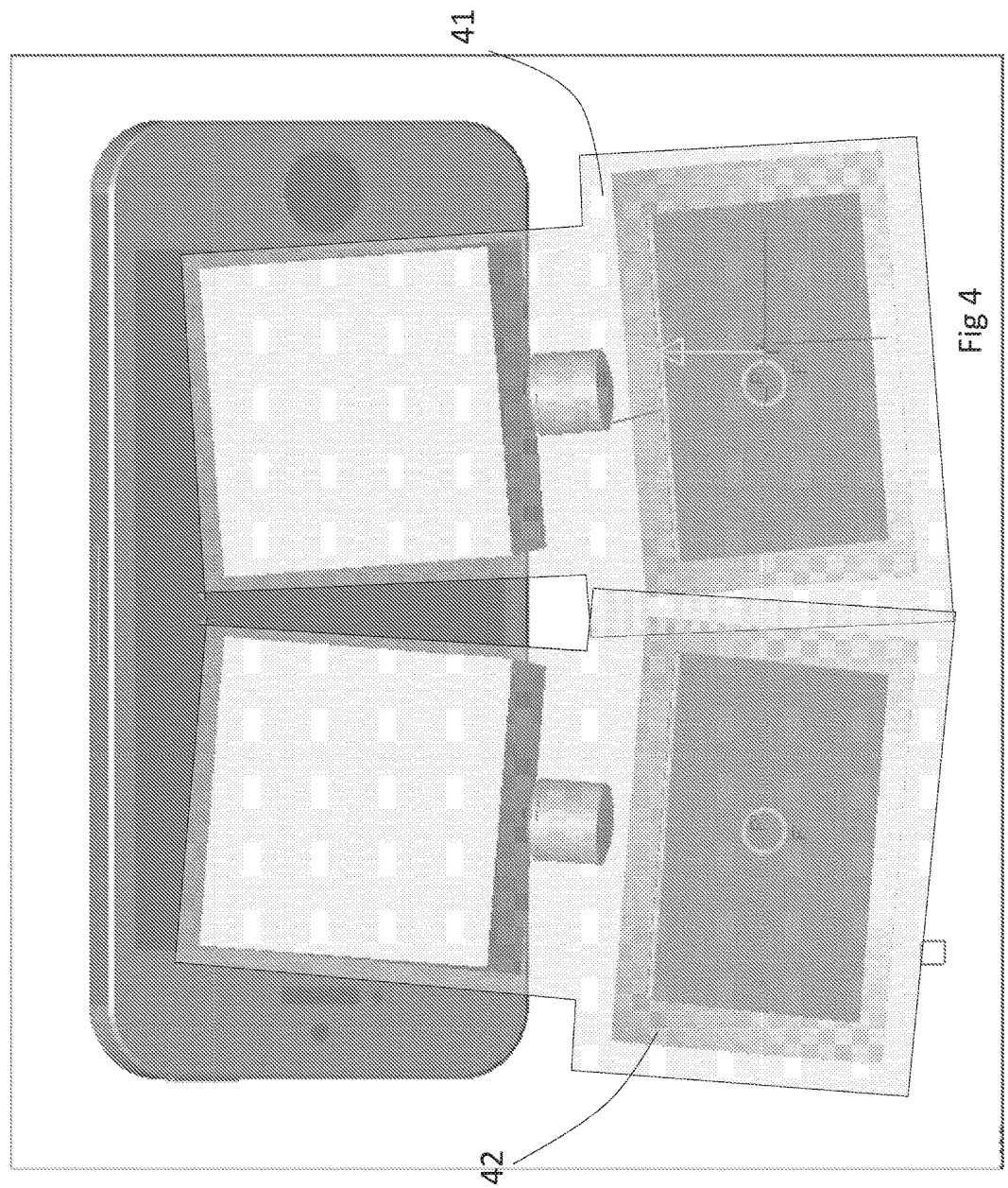
FIGS. 4 and 5 are simplified illustrations of adjusting the distance between two eyes (Interpupilarity distance—IPD), wherein projection optics are rotated outwards to enlarge the IPD (FIG. 4) and inwards to reduce the IPD (FIG. 5).
Figure 5:
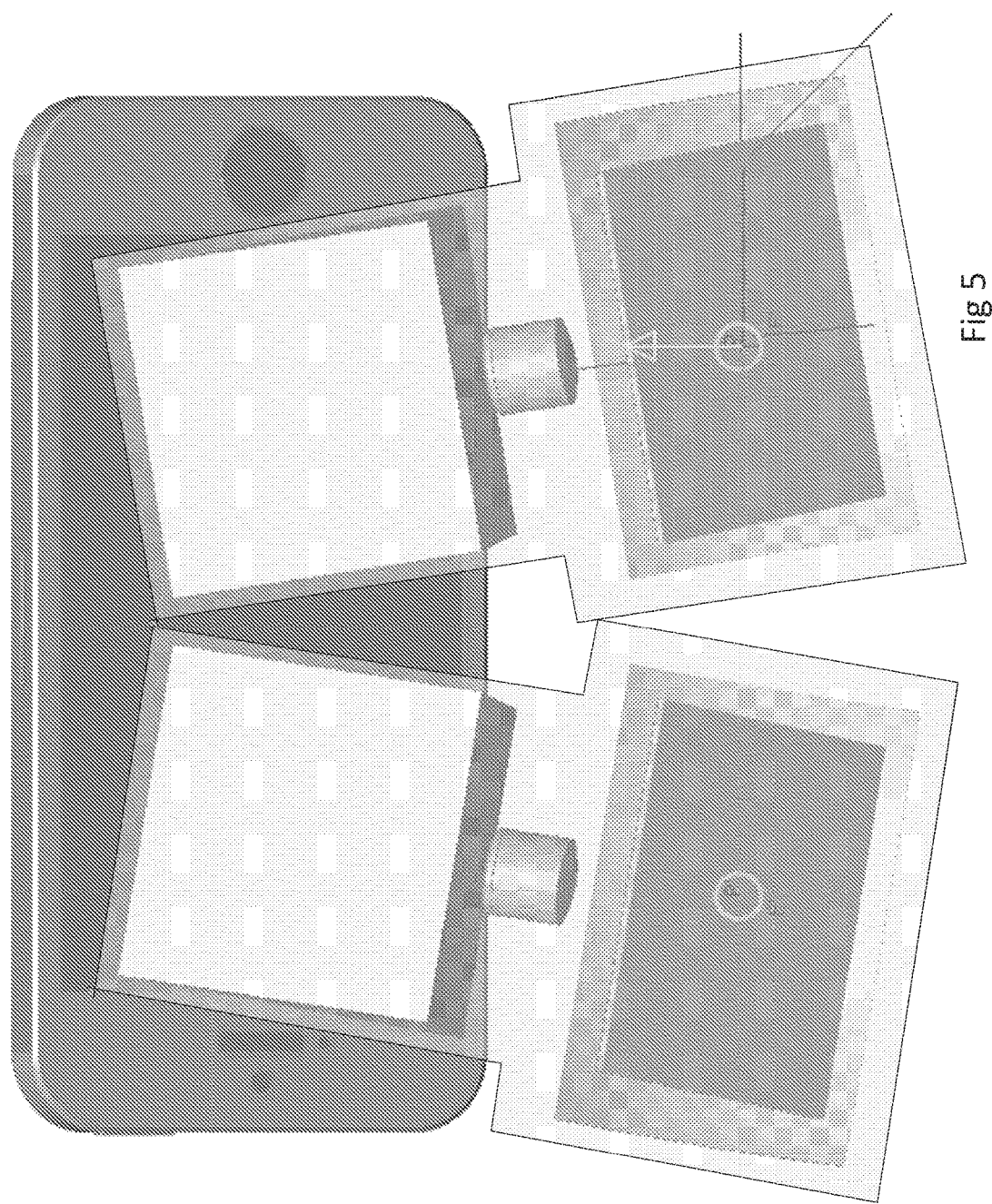

Reference is now made to FIGS. 4 and 5, which illustrate adjusting the distance between two eyes (IPD). The projection optics for the right eye 41 and for the left eye 42 are rotated outwards to enlarge the IPD (FIG. 45) and inwards to reduce the IPD (FIG. 4).

FIG. 6 illustrates a perspective view of the first embodiment.

Figure 7:
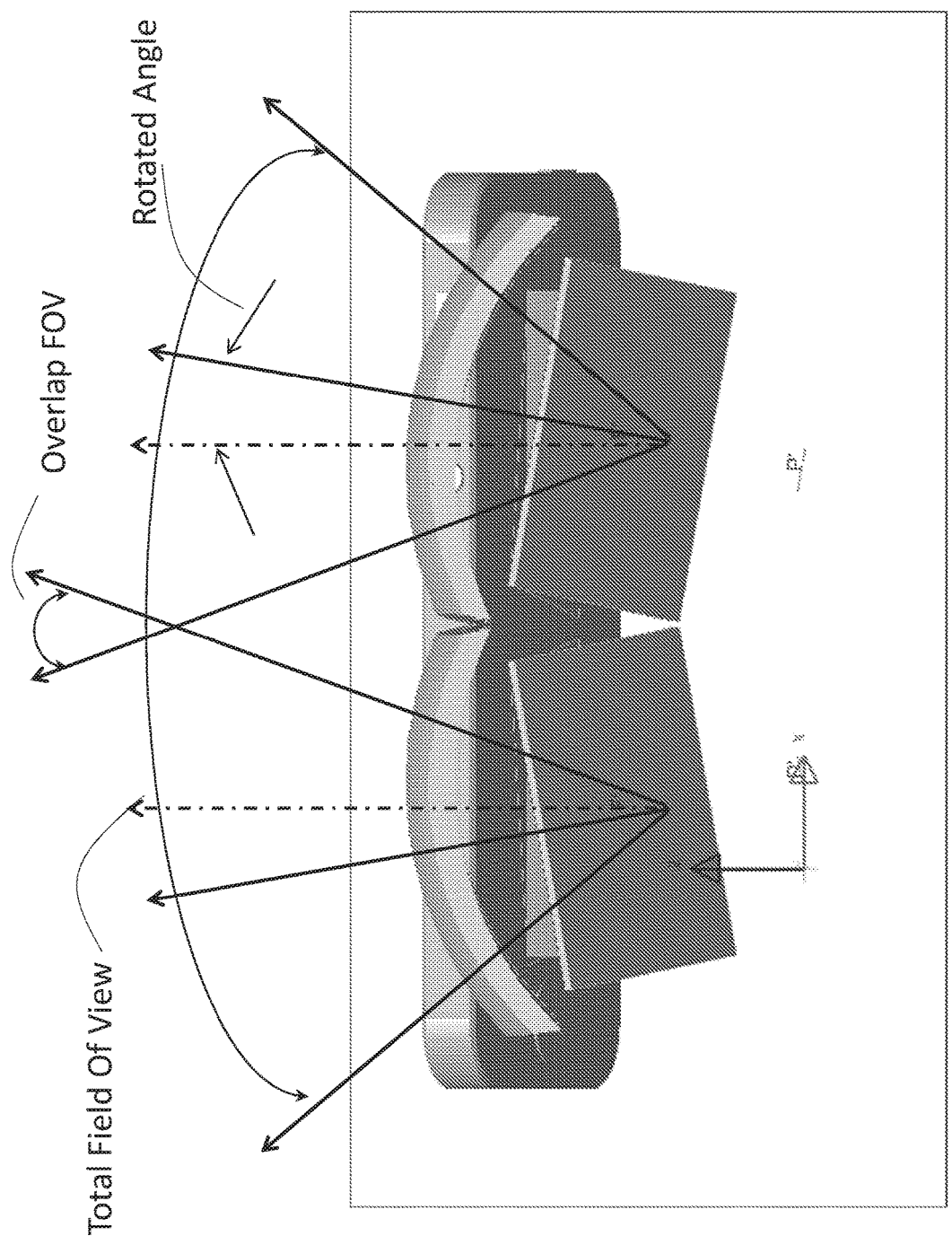
FIG. 7 is a simplified top view of a wearable optical system, constructed and operative in accordance with another embodiment of the present invention, in which the binocular FOV is enlarged by rotating each eye-piece around the optical axis of the relay lens in opposite directions.
Figure 8:
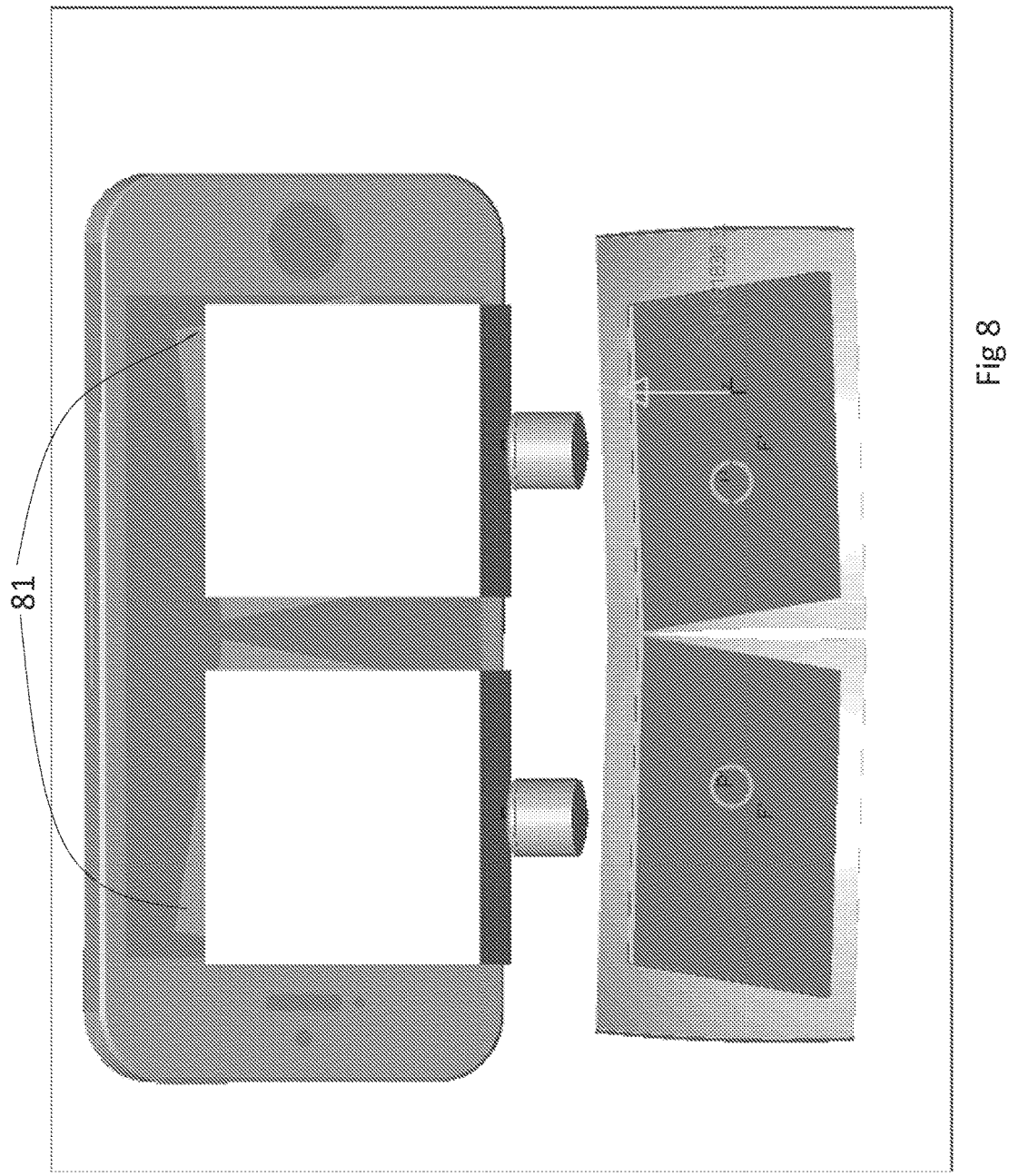
FIG. 8 is a simplified illustration of rotating a display zone, in accordance with an embodiment of the present invention.

FIG. 7 is a top view of another embodiment for an arrangement which makes it possible to enlarge the binocular FOV by rotating each eye-piece around the optical axis of the relay lens in opposite directions. In this embodiment, the overlap between both eyes decreases but the total FOV increases. In this case, the display zone 81 can also rotate, as shown in FIG. 8.

Figure 9:
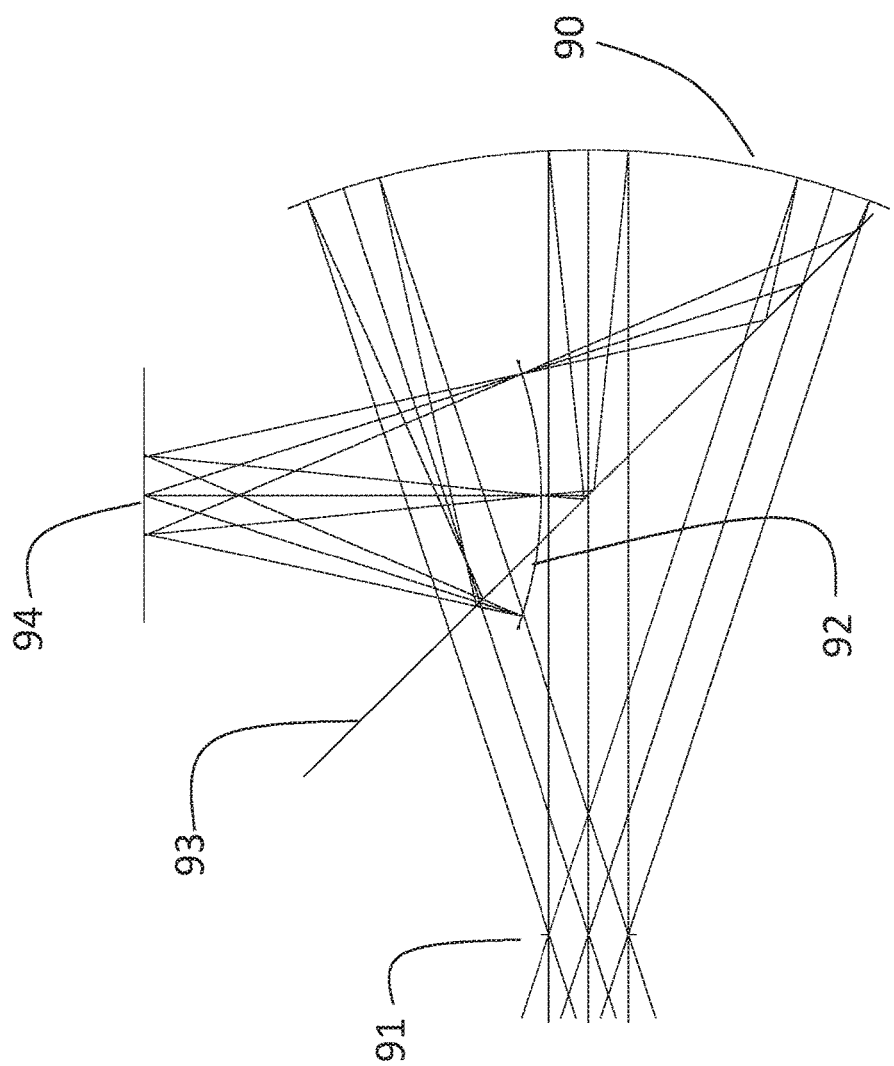
FIG. 9 is a simplified schematic illustration of an eye-piece, in accordance with an embodiment of the present invention.

The eye-piece is now described with reference to FIG. 9. The eyepiece has a large FOV by using a concave mirror 90 with a radius equivalent to the distance from the exit pupil 91 to the concave mirror 90. In this case, all field angles are perpendicular to the surface of the concave mirror 90. This means there are no aberrations due to the field of view. The focal plane 92 is located at half of the mirror radius of curvature and also has a radius of curvature which is half that of the mirror curvature. A flat beam-splitter 93 reflects the rays and forms an image 94 of the exit pupil 91 which will finally be the stop of the system.

This type of eye-piece is very lightweight and has almost no field aberrations (slight aberration may be seen due to the beam-splitter thickness).

FIG. 10 illustrates a relay lens 101 located at a stop 102 of the eyepiece. Relay lens 101 relays at least a portion of a smartphone screen 103 onto a focal plane 104 of a concave mirror 105.

FIG. 11 illustrates adding a 90-60-30 prism 111 above the relay lens 101. Some advantages of adding the 90-60-30 prism 111 are as follows:

1. The prism is not sensitive to rotation, so that the viewed image does not rotate while rotating the projection optics around its mechanical pivot
2. This reduces the thickness 112 of the system.
3. This reduces the distance 113 of the center mass of gravity (CMG) 114 of the system compared to using just a simple mirror 121 as shown in FIG. 12.
4. Ergonomically shaping of the system as can be seen in FIG. 3.

Another embodiment is described in FIG. 13, which includes a mirror 131, which replaces the prism 111 described in FIG. 11. In this embodiment, the display 133 is located closer to the user 134, facing the opposite direction 132 of the user and also has the same advantages as described above for FIG. 11.

What is claimed is:

1. A wearable optical system comprising:
    a body attachable to a user's head, a fixture in which a screen with two display zones one for each eye, is mounted facing said user, and two projection optical subassemblies, each said optical subassembly being rotatable about a pivot perpendicular to a surface of the screen on which images are displayed and located at a center of said display zone for each respective optical subassembly.

2. The system according to claim 1, wherein each optical subassembly comprises an eye-piece, a relay lens and a folding prism.

3. The system according to claim 2, wherein said eye-piece comprises at least one semi-reflected concave mirror and a beam-splitter for superimposing said display zone onto real-world.

4. The system according to claim 2, wherein said relay lens is located near a stop of projection optics and relays said display zone towards an image plane of said eye-piece.

5. The system according to claim 2, wherein said folding prism is located between the relay lens and said display zone.

6. A wearable optical system comprising:
    a body attachable to a user's head, a fixture in which a screen with two display zones, one for each eye, is mounted facing away from said user and two projection optical subassemblies, each said optical subassembly being rotatable about a pivot perpendicular to a surface of said screen on which images are displayed and located at a center of said display zone for each respective optical subassembly.

7. The system according to claim 6, wherein each optical subassembly comprises an eye-piece, a relay lens and a folding mirror.

8. The system according to claim 7, wherein said eye-piece comprises at least one semi-reflected concave mirror and a beam-splitter for superimposing said display zone onto real-world.

9. The system according to claim 7, wherein said relay lens is located near a stop of projection optics and relays said display zone towards an image plane of said eye-piece.

10. The system according to claim 7, wherein said folding mirror is located between the relay lens and said display zone.

* * * * *